US012024688B2

(12) United States Patent
Fretay et al.

(10) Patent No.: US 12,024,688 B2
(45) Date of Patent: Jul. 2, 2024

(54) PROCESS FOR THE SUSTAINABLE DESIGN OF PERFUMES

(71) Applicant: Givaudan SA, Vernier (CH)

(72) Inventors: Herve Fretay, Paris (FR); Philippe Durand, Bois Colombes (FR); Karen Jenner, Kent (GB); Natalie Rabin, Singapore (SG); Coralie Vernac-Foretnegre, Deuil—La Barre (FR)

(73) Assignee: Givaudan SA, Vernier (CH)

( * ) Notice: Subject to any disclaimer, the term of this patent is extended or adjusted under 35 U.S.C. 154(b) by 160 days.

(21) Appl. No.: 17/290,602

(22) PCT Filed: Nov. 4, 2019

(86) PCT No.: PCT/EP2019/080060
§ 371 (c)(1),
(2) Date: Apr. 30, 2021

(87) PCT Pub. No.: WO2020/094550
PCT Pub. Date: May 14, 2020

(65) Prior Publication Data

US 2021/0355410 A1 Nov. 18, 2021

(30) Foreign Application Priority Data

Nov. 6, 2018 (EP) .................................... 18204658

(51) Int. Cl.
*C11B 9/00* (2006.01)
*C11D 3/50* (2006.01)

(52) U.S. Cl.
CPC .................................... *C11B 9/00* (2013.01)

(58) Field of Classification Search
CPC .................................................. C11B 9/00
See application file for complete search history.

(56) References Cited

U.S. PATENT DOCUMENTS

2006/0010170 A1 1/2006 Ashley et al.

FOREIGN PATENT DOCUMENTS

WO 2017133779 A1 8/2017

OTHER PUBLICATIONS

International Search Report for Application No. PCT/EP2019/080060 dated Mar. 24, 2020.
Written Opinion of the International Searching Authority Application No. PCT/EP2019/080060 dated Mar. 24, 2020.

(Continued)

*Primary Examiner* — Jessica Whiteley
(74) *Attorney, Agent, or Firm* — Curatolo Sidoti & Trillis Co., LPA; Salvatore A. Sidoti; Floyd Trillis, III

(57) ABSTRACT

A method of creating a perfume composition sustainably, said method comprising the steps of forming the composition comprising ingredients having a known and acceptable sustainability rating determined according to a sustainability rating method defined by certain sustainability factors selected from a factor related to the environmental impact of both the individual ingredients and the formula containing said ingredients; a factor related to the origin of the ingredients; a factor related to the energy consumption used in production of the formula; and a factor related to the sustainable sourcing of the ingredients.

8 Claims, 2 Drawing Sheets

(56) References Cited

OTHER PUBLICATIONS

European Extended Search Report for Application No. 18204658.1 dated Mar. 7, 2019.
Great Britain Search Report for Application No. 1903625.0 dated Sep. 13, 2019.
Why Are Perfumes Harmful for the Environment, Greentumble, Oct. 12, 2016, available at: https://greentumble.com/why-are-perfumes-harmful-for-the-environment/.
How Perfume Is Made—A Master Perfumers' Industry Guide, Alpha Aromatics, Jun. 5, 2017, available at: https://www.alphaaromatics.com/blog/how-perfume-is-made-the-perfumers-industry-guide/.
Record locking, Wikipedia, Apr. 4, 2014, available at: https://en.wikipedia.org/w/index.php?title=Record_locking&oldid=602794281.
Michel Philippe, PhD, et al., Natural, Sustainable Innovation: L'Oreal's Commitment to Renewable Materials & Eco- Friendly Processes, ACS Webinars, Feb. 16, 2017.
Paul T. Anastas, et al., Design Through the 12 Principles of Green Engineering, Environmental Science & Technology, Mar. 1, 2003, p. 94A-101A, American Chemical Society.
IUCN Red List Categories and Criteria, Species Survival Commission, Feb. 9, 2000, Version 3.1 Second Edition, IUCN, Gland, Switzerland.
OCED Guideline for Testing of Chemicals, Jul. 17, 1992.
OECD Guidelines for Testing of Chemicals, Section 305, Oct. 2, 2012.
Green chemistry's 12 principles, United States Environmental Protection Agency, available at: https://www.epa.gov/greenchemistry/basics-green-chemistry#twelve.

PROCESS FOR THE SUSTAINABLE DESIGN OF PERFUMES

CROSS REFERENCE TO RELATED APPLICATIONS

This application is a national stage application of International Application No. PCT/EP2019/080060, filed 4 Nov. 2019, which claims priority from European Patent Application No. 18204658.1, filed 6 Nov. 2018, both of which applications are incorporated herein by reference.

FIELD OF THE INVENTION

The present invention relates generally to the field of perfumery. More particularly, it relates to the sustainable design of perfume formulae, perfume compositions corresponding to said formulae and consumer products containing said compositions.

BACKGROUND OF THE INVENTION

Traditionally, in the fields of both technical perfumery and fine perfumery, the principle design considerations for perfumers were related to hedonics and functionality. Environmental considerations were considered less as an element of perfume design and more a matter of regulation or internal compliance.

More recently, threats impacting the environment have led society to become increasingly committed to confront known and developing environmental concerns related to traditional industrial practices.

In the world of perfumery, companies have come to appreciate the considerable intangible and tangible benefits attendant to sustainable product design in terms of the goodwill and brand equity that such practice generates, as well as the opportunity that new design constraints present to differentiate their products and services over competitor offerings.

Of course, in order to demonstrate differentiation, it is necessary to define easily understandable and objectively verifiable metrics by which to measure and compare the performance a company's products over those of competitors. This is of particular importance for companies on the supply-side of b2b relationships, who need to convince their corporate customers of their sustainability credentials and gain product acceptance.

A number of companies have proposed sustainability criteria or models as aids for sustainable product design.

A particular example of a so-called 'sustainability scorecard' is disclosed in WO2017/133779. The approach set out in this application is to increase transparency of the environmental impact of perfume ingredients (and their related raw materials) on product design. However, addressing the issue of sustainability merely at the ingredient level, does not take into account the environmental impact of both production and procurement issues related to compounding (mixing) perfume ingredients to provide finished perfume compositions. Furthermore, the metrics selected to measure sustainability rely upon detailed knowledge of all aspects of ingredient production processes. This does not create a problem if the party using the scorecard is the proprietor of the perfume ingredients concerned, but the metric cannot be accurately calculated for ingredients manufactured by third parties. As a result, many of the metrics upon which this scorecard approach relies are based on guess-work and assumptions. Indeed, the overall impression of this approach is that it hints at clarity and transparency, but in reality it creates considerable uncertainty as to the true sustainability credentials of perfume ingredients and perfume formulae alike.

Another example of a sustainability model is the so-called 'Naturalness Index' introduced by L'Oréal in 2016, which takes into account the natural or synthetic origin of ingredients, whether ingredients are of animal origin, the manner in which ingredients are extracted, and the amount of renewable carbon they contain. Once again, this model only looks at the issue from the ingredient level, and not at the level of the finished formula comprising a mixture of ingredients. Furthermore, the Naturalness Index suffers from a lack of discriminating power when applied to classes of perfume ingredients, by which is meant, substantially all synthetic ingredients are tightly clustered around a relatively low sustainability rating score, whereas substantially all natural ingredients are tightly clustered around a relatively high sustainability rating score. If an index is to have real analytical power in enabling perfumers to formulate across the spectrum of synthetics, naturals and nature-identical ingredients it has to be able resolve ingredients within a specific class, i.e. the class of natural, nature-identical or synthetic classes, along a sustainability rating scale.

Other prior art scorecard approaches to sustainable perfume design also place considerable importance on the positive impact of natural ingredients, which is driven to some extent by consumer perception that natural ingredients are 'greener' and more sustainable than their synthetic counter-parts. This perception is not necessarily accurate, as for certain ingredients, the amount of biomass required to obtain natural extracts for perfumery may be very significant. For example, it may take as much as 5 million jasmine flowers to obtain one kilogram of Jasmine absolute. Therefore, creating a higher demand for certain natural ingredients can adversely affect the availability of key crop materials globally. At the same time, the term "synthetic" as it relates to perfume ingredients is not synonymous with unsustainable practices as such, particularly if they are prepared using sustainable methods, for example, according to the so-called twelve Principles of Green Chemistry issued by the US Environment Protection Agency, which include the use of renewable carbon and waste-streams, energy saving processes and the like. Details of the twelve Principles of Green Chemistry may be found in P. T. Anastas and J. B. Zimmerman, "Design through the Twelve Principles of Green Engineering", Env. Sci. and Tech., 37, 5 (2003) pages 94A-101A.

All of this is to say that any design methodology based on metrics that emphasize the importance of high usage levels of natural ingredients will limit the design freedom of perfumers to create great-smelling perfume formulae that are highly performing in application, but will not necessarily drive sustainable practices.

SUMMARY OF THE INVENTION

There remains a need to provide a method of preparing perfume formulae as well as perfume compositions based on these formulae, which method includes the step of selecting a perfume formula meeting certain sustainability acceptance criteria as determined by said perfume having a desirable sustainability rating score, which method of determining the sustainability rating is set out in detail below. More particularly, the method not only enables the effective analysis of the sustainability of perfume formulae, but does so in an objectively verifiable manner to give consumers of perfume formulae, and in particular corporate customers on the purchasing side of a b2b relationship, the confidence that the perfume supplier is credibly addressing social and environmental responsibility, and not merely signaling sustainability credentials. Furthermore, there is a need to provide a perfume design methodology that drives the industry to a more creative and sustainable use of natural ingredients in perfumery, which encompasses the complete palette of ingredients, from synthetics, through nature-identical and natural ingredients.

Applicant now provides a method of creating perfume formulae and perfume compositions based thereon in a sustainable manner, which method includes the step of determining a sustainability rating of a perfume formula using a sustainability-rating algorithm that is a function of certain sustainability factors, sub-factors and associated metrics that are objectively measurable or verifiable across the palette of perfumery ingredients, and which factors, sub-factors and metrics include those directly related to the compounding (mixing) of perfume ingredients.

The invention provides in a first aspect a method of preparing a perfume formula sustainably, the method comprising the steps of:

Selecting at least one perfume ingredient from a palette of perfume ingredients to create a perfume formula;

Rating each selected ingredient as well as the mixture of perfume ingredients against a plurality of sustainability factors in order to determine a sustainability rating for the perfume formula;

Determining if the sustainability rating obtained falls within an acceptable range of sustainability rating values;

Selecting a perfume formula that does possess a sustainability rating falling within said acceptable range; and Mixing the perfume ingredients contained in the selected perfume formula to obtain a perfume composition that has an acceptable sustainability rating.

In a second aspect the invention provides a perfume composition having a known sustainability rating.

In a third aspect the invention provides a consumer product comprising the perfume composition.

These and other aspects and embodiments of the present invention will be described with reference to the following description and drawings, which are illustrative of exemplary embodiments of the invention.

DETAILED DESCRIPTION OF THE INVENTION

The sustainability rating (S) for a perfume formula is a mathematical function of relevant sustainability factors and sub-factors described herein below that drive the sustainability rating of ingredients and perfume formulae.

Figure 1:
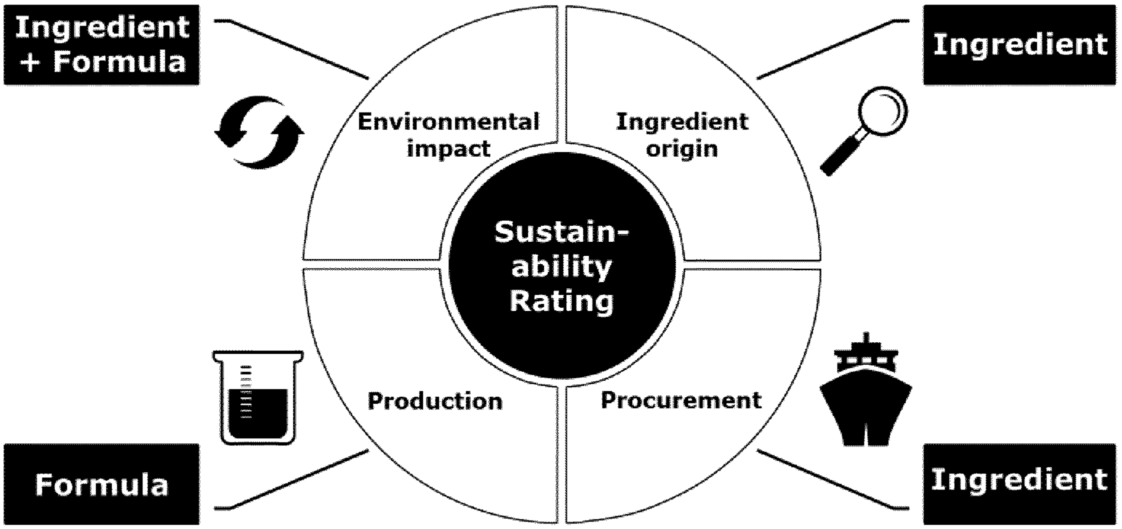
FIG. 1 is a representation of sustainability factors that are used in the determination of a sustainability rating for a perfume formula according to the present invention. The Environmental Impact factor is defined at both ingredient and formula level, the Ingredient Origin factor and the Procurement factor are defined at ingredient level only, and the Production factor is defined at formula level only.

The sustainability factors and their associated sub-factors defined hereinafter are believed to be key drivers in the assessment of the sustainability rating of both perfume ingredients and the perfume formulae comprising mixtures of those ingredients. As shown in FIG. 1, the selected sustainability factors encompass environmental impact aspects of both ingredients and formulae; aspects related to the origin of the ingredients; the impact related to the compounding of formulae containing multiple ingredients, especially in terms of energy and resource consumption (Production); and aspects related to ingredient sourcing (Procurement).

Other factors, sub-factors and metrics may be included in the calculation of sustainability ratings in accordance with the present invention, however, the factors, sub-factors and associated metrics referred to specifically herein, allow perfume formulators and their customers to make objective and verifiable assessment of the sustainability rating of perfume formulae made using a wide palette of perfume ingredients including both ingredients proprietary to the formulator, as well as those sourced by the formulator from third parties. This has the added benefit of serving the interests of clarity or transparency of formula design. Furthermore, the method of calculating sustainability ratings in accordance with the present invention has a higher discriminating power with respect to both ingredients and formulae compared to prior art indices.

The general equation defining the sustainability rating has the form depicted in Equation 1:

$$S=f(\text{Sustainability factors}) \tag{1}$$

The sustainability factors are selected on the basis not only of their relevance to the sustainable design of perfume formulae, but also on the basis of their simplicity, accessibility, and ease of understanding for both creators of perfume formulae and their customers. The value of each factor is typically ranging from 0 to 1. Furthermore, the factors may be weighted by a weighting factor, typically ranging from 0 to 10.

Each sustainability factor is defined as a function of one or more sub-factors. These sub-factors are chosen on the basis that they can be objectively measured, calculated or verified across the palette of perfume ingredients and perfume formulae. Each sub-factor is associated with a metric that determines its numerical value, typically ranging from 0 to 1. Furthermore, the sub-factors may be weighted by a weighting factor, typically ranging from 0 to 1.

A characteristic feature of the invention is that whereas many of the sub-factors are defined either at the ingredient level only, some are defined at the formula level.

The introduction of formula-specific sub-factors is believed to be novel over prior art methods.

The sustainability rating method has been developed and validated with reference to thousands of hedonically pleasing and functional perfume formulae, which contain wide-ranging levels of synthetic ingredients, natural ingredients and nature-identical ingredients. Accordingly, the method of calculating the sustainability rating is eminently useful for managing both current and future evolutions of sustainable perfume formulae. Furthermore, because the method incorporates a compounding (i.e. ingredient mixing) sub-factor, the sustainability rating is calculated for a finished (i.e. olfactively acceptable and/or performant) perfume formulae and so it necessarily includes hedonics and performance (functionality) as important elements of the sustainability rating algorithm.

Of course, the sustainability rating calculation is flexible, and should the formulator simply want to measure sustainability ratings for single ingredients contained in a perfumer's palette in order to create an index of sustainability ratings it can do so simply by disregarding the formula-specific sub-factors from the algorithm.

As a result of this development work, four factors and eight sub-factors have been identified that define the sustainability rating of both perfumery ingredients and/or formulae.

The four factors are (i) the Environmental Impact factor (referred to as "Env" hereinafter), related to the environmental impact of the perfume at both ingredient and formula level;

(ii) the Ingredient Origin factor ("Orig"), related to whether the ingredient is of synthetic origin, or of natural origin, from plants or from animal, as well as to the amount of renewable carbon present in the ingredient chemical nature;

(iii) the Production factor ("Prd"), related to the energy consumption associated with formula compounding; and (iv) the Procurement factor ("Prc"), related to the sustainability of sourcing.

Each factor may take values in the range of 0 to 1.

The 8 sub-factors are:

(i) the biodegradability sub-factor "Biodeg" is related to the how much and how fast an ingredient is biodegraded. This sub-factor is defined at the ingredient level;

(ii) the number percentage of upcycled carbon present in the ingredient chemical structure "Upcycl". This sub-factor is defined at ingredient level;

(iii) the hazard sub-factor ("Hazard"), which is related to the aquatic toxicity of a formula. This sub-factor is defined at formula level;

(iv) the inherent nature of the ingredient "Iso", as defined by the norm ISO 9235. This sub-factor is defined at ingredient level;

(v) the number percentage of renewable carbon atoms present in the ingredient chemical structure "RenewC". This sub-factor is defined at ingredient level;

(vi) the feature whether an ingredient is from animal origin or not ("Animal"). This sub-factor is defined at ingredient level;

(vii) the compounding sub-factor ("Compound"), which is related to the energy consumption associated with mixing (compounding) the perfume ingredients according to the formula. This sub-factor is defined at formula level;

(viii) the responsible sourcing sub-factor "Resp", which is related to the compliance of ingredient sourcing with respect to social, environmental and ethical rules. This sub-factor is defined at ingredient level.

The sub-factors (i) through (iii) attach to the "EnV" factor; (iv) through (vi) attach to the "Orig" factor; (vii) attaches to the "Prd" factor; and (viii) attaches to the "Prc" factor.

Each sub-factor may take values within the range of 0 to 1.

The sustainability rating according to the present invention can be more specifically expressed in the form of Equation 1b:

$$S=f(\text{Env};\text{Orig};\text{Prd};\text{Prc}) \quad (1b)$$

Equation 1b can be more specifically expressed as a linear combination of sustainability factors, as shown in Equation 2:

$$S=u_1\text{Env}+u_2\text{Orig}+u_3\text{Prd}+u_4\text{Prc} \quad (2)$$

Wherein, $u_1$, $u_2$, $u_3$ and $u_4$ are weighting factors.

Referring to Equation 2 above, each sustainability factor "Env", "Orig, "Prc" and "Prd" will be assigned a value between 0 and 1, the value assigned to a sustainability rating based on four sustainability factors will be between 0 and 4, wherein the higher the value, the more sustainable the perfume formula is deemed to be.

Each of the weighting factors $u_1$, $u_2$, $u_3$ and $u_4$ has a value ranging from 0.1 to 10, more particularly from 0.5 to 5.

More particularly, the weighting factors can be assigned the values $u_1=2$, $u_2=2$, $u_3=1$ and $u_4=1$, so that $$S=2*\text{Env}+2*\text{Orig}+1*\text{Prd}+1*\text{Prc}\leq 6 \quad (2b)$$

The weighting factors according to this embodiment take better into account that both "EnV" and "Orig" factors include more sub-factors than the Prd and Prc factors, which are defined by only one sub-factor each.

If desired, Equation 2 or 2b may be re-scaled in such a way that S can take any value between 0 and 10, which may be more convenient for the user of the rating:

$$S=3.33*\text{Env}+3.33*\text{Orig}+1.67*\text{Prd}+1.67*\text{Prc}\leq 10 \quad (2c)$$

The environmental impact factor of a perfume ingredient is concerned with quantifying the biodegradability and the fraction of upcycled carbon contained in the ingredient. Thus, for an ingredient k:

$$\text{Env}_k=v_1*\text{Biodeg}_k+v_2*\text{Upcycl}_k$$

wherein, $v_1$ is from 0.6 to 0.9, preferably from 0.7 to 0.8, more preferably 0.75, and $v_2$ is from 0.1 to 0.4, preferably from 0.2 to 0.3, more preferably 0.25.

In the above equation, the subscript letter "k" following the sub-factor "Biodeg" refers to a specific ingredient "k". Thus "$\text{Biodeg}_k$" is the value of the biodegradability score for ingredient k. The same notation is applied to sub-factor "Upcycl" and to all other sub-factors in the equations hereinafter.

As the subscript letter "k" can be defined for each ingredient in a formula and can take any value 1 to N if N ingredients are present in the formula, this subscript letter "k" is called an index. How the scores of both "$\text{Biodeg}_k$" and "$\text{Upcycl}_k$" sub-factors are calculated is described hereinafter.

The Environmental Impact factor ("Env") of a perfume formula is concerned with quantifying the biodegradability; the fraction of upcycled carbon; and the aquatic toxicity of the formula.

The biodegradability sub-factor of a perfume formula "Biodeg", is defined as the weighted sum of the individual ingredient biodegradability scores "$\text{Biodeg}_k$".

$$Biodeg = \sum_{1}^{N} c_K \; Biodeg_k$$

Wherein $c_k$ is the weight fraction (wt %/100) of ingredient k, and "$Biodeg_k$" is the biodegradability sub-factor of ingredient k. wt % is the percentage by weight of the ingredient in the formula, based on the total weight of the formula.

The upcycled carbon sub-factor of an ingredient k, referred to as "$Upcycl_k$" hereinafter, refers to the number fraction of carbon atoms present in the chemical structure of this ingredient that has been reused. For example an upcycled carbon atom in the ingredient may have been sourced from a side product of another process or from waste material. Upcycling is an advantageous alternative to recycling and has a more favorable environmental impact than the latter.

The "$Upcycl_k$" score of a complex natural ingredient, such as an essential oil, is given the value 1. By the term "complex natural ingredient" is meant an ingredient that consists of multiple constituent ingredients, as is typical of essential oils or natural extracts. The upcycled carbon sub-factor of a perfume formula is obtained by performing a weighted summation of the individual ingredient upcycled carbon "$Upcycl_k$" sub-factors.

$$Upcycl = \sum_{1}^{N} c_K \; Upcycl_k$$

The mathematical expression of the Environmental Impact factor of a perfume formula may be more particularly expressed by Equation 3:

$$Env = w_1 * \sum_{1}^{N} c_K \; Biodeg_k + w_2 * \sum_{1}^{N} c_K \; Upcycl_k + w_3 * \text{Hazard} \quad \text{(Equation 3)}$$

wherein $c_k$ is the weight fraction (wt %/100) of ingredient k, "$Biodeg_k$" is the biodegradability sub-factor of ingredient k, "$Upcycl_k$" is the upcycled carbon sub-factor ingredient k, and the summation is performed over the N ingredients contained in the perfume formula. $w_1$, $w_2$ and $w_3$ are weighting factors, the sum of which is 1.

The "Hazard" sub-factor is calculated at formula level only. The manner in which this sub-factor is determined is explained in more detail herein below.

The weighting factor $w_1$ may take the value of 0.3 to 0.6, preferably 0.4; $w_2$ may take the value of 0 to 0.3, preferably 0.2; and the weighting factor $w_3$ may take the value of 0.3 and 0.6, preferably 0.4.

The biodegradability sub-factor for an ingredient is assigned a value between 0 and 1 having regard to the extent to which a given ingredient is broken down in nature. Methods to assess the extent an ingredient is broken down are known in the art. For example, the OECD Guidelines for testing chemicals, adopted by the Council on 17 Jul. 1992 discloses methods to assess the so-called "Ready Biodegradability" and "Inherent Biodegradability". These methods are available from the OECD.

The ingredient specific "$Biodeg_k$" sub-factor value is attributed according to the following rules:

- "$Biodeg_k$"=1 if i) the ingredient is readily biodegradable according to OECD methods 301F, according to OECD (1992), Test No. 301: Ready Biodegradability, OECD Guidelines for the Testing of Chemicals, Section 3, OECD Publishing, Paris, https://doi.org/10.1787/9789264070349-en; wherein readily biodegradable means in this case that 60 wt % of the ingredient is degraded within 10 days; or ii) if a readily biodegradable ingredient is diluted in a readily biodegradable solvent; or iii) if the ingredient is an inorganic material to which the concept of biodegradability does not apply;
- "$Biodeg_k$"=0.9 if the ingredient is inherently biodegradable according to OECD methods 301F, wherein inherently biodegradable means in this case that 60 wt % of the ingredient has been degraded within 28 days;
- "$Biodeg_k$"=0.8 if the ingredient is inherently biodegradable under conditions more favorable to biodegradation, such as for example the conditions prevailing in sewage plants, according to OECD methods 302B, according to OECD Test No. 302B: Inherent Biodegradability: Zahn-Wellens/EVPA Test, OECD Guidelines for the Testing of Chemicals, Section 3, OECD Publishing, Paris, https://doi.org/10.1787/9789264070387-en, whereas inherently biodegradable means in this case that 70 wt % of the ingredient has been degraded within 28 days;
- "$Biodeg_k$"=0 if the ingredient is neither readily nor inherently biodegradable, meaning the ingredient does not pass the criteria set forth by the OECD methods mentioned hereinabove;
- "$Biodeg_k$"=the number-average of the known values for $Biodeg_k$ sub-factors of ingredients if data on the biodegradability of the particular ingredient is unavailable.

The "$Biodeg_k$" score of an ingredient may also be predicted by using model-based prediction tools, such as Catalogic software, available from the Laboratory of Mathematical Chemistry (LMC), Burgas, Bulgaria.

The "$Biodeg_k$" score of a complex natural ingredient, such as an essential oil, is defined as the weighted sum of the individual biodegradability scores "$Biodeg_k$" of the major constituents contained in the complex natural ingredient, wherein "major constituent" means a constituent, which is present at a level of more than 1 wt %, based on the total weight of the complex natural ingredient.

The "Biodeg" sub-factor calculation method described hereinabove is particularly preferred in the context of the present invention. However, such methods may be updated with time or replaced by new methods, depending on the regulatory context. Such updated or new methods may be also used in the context of the present invention.

The "Hazard" sub-factor may comprise environmental hazards, such as aquatic toxicity and bioaccumulation, and human hazard, such as allergenicity and skin irritation.

In a particular embodiment, the definition of the "Hazard" sub-factor is based on the Guidelines of the UNECE Globally Harmonized System of Classification and Labelling of Chemicals (GHS) for acute and chronic aquatic toxicity, edited by the United Nations, 2011, ISBN No 978-92-1117042 (chapter 4.1, especially § 4.1.2.1.4, § 4.1.3.5.5.3 and § 4.1.3.5.5.4). This sub-factor is formula-specific and is composed of an acute hazard category score, referred to hereinafter as "Acute 1" category, "Acute 2" category or "Acute 3" category, and a chronic hazard category score, referred to as "chronic 1" category, "Chronic 2" category, "Chronic 3" category or "Chronic 4" category, as defined hereunder.

The acute aquatic hazard category score of a perfume formula is defined as follows and will be used as such for determining the acute aquatic hazard category of a perfume formula:

A perfume formula is classified as "Acute 1" if the weighted sum of the concentrations (in wt %) of the ingredients present in the perfume formula that are classified as belonging to the Acute 1 ingredient category is larger than or equal to 25 wt % based on the total weight of the perfume formula. By definition (Table 4.1.2 UNECE Guidelines mentioned hereinabove), the Ingredients belonging to the "Acute 1" ingredient category class have a median lethal concentration $LC_{50}$ at 96 hours for fish or median lethal concentration $EC_{50}$ at 48 hours for crustaceans, which is smaller than or equal to 1 wt %. The coefficient M (see below) is $LC_{50}$- or $EC_{50}$-dependent, referred to as $L(E)_{50}$ in the following, the notation $L(E)_{50}$ meaning $LC_{50}$- or $EC_{50}$, (see Table 4.1.5 of the UNECE Guidelines mentioned hereinabove):

$M=1$ if $0.1<L(E)_{50}\leq 1$ mg/l $M=10$ if $0.01<L(E)_{50}\leq 0.1$ mg/l $M=100$ if $0.001<L(E)_{50}\leq 0.01$ mg/l $M=1000$ if $0.0001<L(E)_{50}\leq 0.001$ mg/l $M=10000$ if $0.0001<L(E)_{50}\leq 0.001$ mg/l This may be expressed by the following equations:

$$\text{“Acute 1” perfume formula if } \sum_{1}^{O} M_i \text{wt } \%_i \geq 25 \text{ wt } \%$$

wherein, the summation limit O refers to the number of "Acute 1" ingredients in the perfume formula.

Similarly, a perfume formula is classified as "Acute 2" if:

$$\sum_{1}^{O} 10 * M_i \text{wt } \%_i + \sum_{1}^{P} \text{wt } \%_j \geq 25 \text{ wt } \%$$

wherein O refers to the number of "Acute 1" ingredients and P refers to the number of Acute 2 ingredients; wherein the ingredients belonging to the "Acute 2" ingredient category are characterized by a median lethal concentration larger than 1 mg/l and smaller than or equal to 10 mg/l; and wherein the indices i and j refer to different ingredients.

Similarly, a perfume formula is classified as "Acute 3" if:

$$\sum_{1}^{O} 100 * M_i \text{wt } \%_i + \sum_{1}^{P} 10 * \text{wt } \%_j + \sum_{1}^{Q} \text{wt } \%_m \geq 25 \text{ wt } \%$$

wherein O refers to the number of "Acute 1" ingredients, P refers to the number of "Acute 2" ingredients and Q refers to the number of "Acute 3" ingredients, wherein the ingredients belonging to the "Acute 3" ingredient category are characterized by a median lethal concentration larger than 10 mg/l and smaller than or equal to 100 mg/l; and wherein the indices i, j and m refer to different ingredients.

The chronic aquatic hazard category score of a perfume formula is obtained by similar summation of chronic ingredient categories. These chronic ingredient categories are defined as follows (see also Table 4.1.2 of the UNECE Guidelines mentioned hereinabove):

The "Chronic 1" ingredient category encompasses ingredients that are readily biodegradable and have a No Observed Effect Concentration (NOEC) smaller than or equal to 0.01 mg/l; and/or ingredients that are not readily biodegradable and have a NOEC smaller than or equal to 0.1 mg/l; and/or ingredients for which the NOEC is not known, but have a $L(E)C_{50}$ smaller than or equal to 1 mg/l and are not readily biodegradable, or have a Bio-Concentration Factor (BCF) larger than or equal to 500 mg/l, as defined under OECD Test Guideline 305 (OECD (1996), Test No. 305: Bioconcentration: Flow-through Fish Test, OECD Publishing, Paris, https://doi.org/10.1787/9789264070462-en or, if unavailable a log octanol/water partition coefficient (log $K_{ow}$) larger than or equal to 4.

The "Chronic 2" ingredient category encompasses ingredients that are readily biodegradable and have a No Observed Effect Concentration (NOEC) larger than 0.01 mg/l but smaller than or equal to 0.1 mg/l; and/or ingredients that are not readily biodegradable and have a NOEC larger than 0.1 and smaller than or equal to 1 mg/l, and/or ingredients for which the NOEC is not known, but have a $L(E)C_{50}$ larger than 1 mg/l but smaller than or equal to 10 mg/l and are not readily biodegradable, or have a Bio-Concentration Factor (BCF) larger than or equal to 500 mg/l, as defined under OECD Test Guideline 305 or, if unavailable a log octanol/water partition coefficient (log $K_{ow}$) larger than or equal to 4.

The "Chronic 3" ingredient class encompasses ingredients that are readily biodegradable and have a No Observed Effect Concentration (NOEC) larger than 0.1 mg/l but smaller than or equal to 1 mg/l; and/or ingredients for which the NOEC is not known, but have a $L(E)C_{50}$ larger than 1 mg/l but smaller than or equal to 100 mg/l and are not readily biodegradable, or have a Bio-Concentration Factor (BCF) larger than or equal to 500 mg/l, as defined under OECD Test Guideline 305 or, if unavailable a log octanol/water partition coefficient (log $K_{ow}$) larger than or equal to 4.

The "Chronic 4" ingredient category encompasses ingredients that have no acute toxicity, are not readily biodegradable; and have a Bio-Concentration Factor (BCF) larger than or equal to 500 mg/l, as defined under OECD Test Guideline 305 or, if absent a log octanol/water partition coefficient (log $K_{ow}$) larger than or equal to 4, unless their NOEC is larger than 1 mg/l.

The "No Observed Effect Concentration (NOEC)" means the concentration immediately below the lowest tested concentration with statistically significant adverse effect.

The "Bio-concentration factor (BCF)" measures the bioaccumulation of an ingredient, according to OECD test guideline 305.

The Chronic hazard class score of a perfume formula is then defined as follows:

A perfume formula is classified as "Chronic 1" if the weighted sum of the concentrations (in wt %) of the ingredients present in the perfume formula that are classified as belonging to the "Chronic 1" ingredient category is larger than or equal to 25 wt % based on the total weight of the formula, wherein the coefficient M depends on $LD_{50}$- or $EC_{50}$-dependent, referred to as $L(E)_{50}$ in the following, the notation $L(E)_{50}$ meaning $LC_{50}$- or $EC_{50}$, (see Table 4.1.4 and Table 4.1.5 of the UNECE Guidelines mentioned hereinabove)

$M=1$ if $0.01<NOEC\leq 0.1$ mg/l (for non-readily biodegradable ingredients)

M=1 if 0.001<NOEC≤0.01 mg/l (for readily biodegradable ingredients)

M=10 if 0.01<NOEC≤0.01 mg/l (for non-readily biodegradable ingredients)

M=10 if 0.0001<NOEC≤0.001 mg/l (for readily biodegradable ingredients)

M=100 if 0.0001<NOEC≤0.001 mg/l (for non-readily biodegradable ingredients)

M=100 if 0.00001<NOEC≤0.0001 mg/l (for readily biodegradable ingredients)

M=1000 if 0.00001<NOEC≤0.0001 mg/l (for non-readily biodegradable ingredients)

M=1000 if 0.000001<NOEC≤0.00001 mg/l (for readily biodegradable ingredients)

M=10000 if 0.000001<NOEC≤0.00001 mg/l (for non-readily biodegradable ingredients)

This may be expressed by the following Equations:

$$\text{"Chronic 1" perfume formula if } \sum_{1}^{A} M_a \text{wt } \%_a \geq 25 \text{ wt } \%$$

wherein A refers to the number of "Chronic 1" ingredients.

Similarly, a perfume formula is classified as "Chronic 2" if:

$$\sum_{1}^{A} 10 * M_a \text{wt } \%_a + \sum_{1}^{B} \text{wt } \%_b \geq 25 \text{ wt } \%$$

wherein A refers to the number of "Chronic 1" ingredients and B refers to the number of "Chronic 2" ingredients; wherein the ingredients belonging to the "Chronic 2" ingredient categories are defined hereinabove; and wherein the indices a and b refer to different ingredients.

Similarly, a perfume formula is classified as "Chronic 3" if:

$$\sum_{1}^{A} 100 * M_a \text{wt } \%_a + \sum_{1}^{B} 10 * \text{wt } \%_b + \sum_{1}^{C} \text{wt } \%_c \geq 25 \text{ wt } \%$$

wherein the A refers to the number of "Chronic 1" ingredients, B refers to the number of "Chronic 2" ingredients and C refers to the number of "Chronic 3" ingredients; wherein the ingredients belonging to the "Chronic 3" ingredient categories are defined hereinabove; and wherein the indices a, b and c refer to different ingredients.

Similarly, a perfume formula is classified as "Chronic 4" if:

$$\sum_{1}^{A} \text{wt } \%_a + \sum_{1}^{B} \text{wt } \%_b + \sum_{1}^{C} \text{wt } \%_c + \sum_{1}^{D} \text{wt } \%_d \geq 25 \text{ wt } \%$$

wherein A refers to the number of "Chronic 1" ingredients, B refers to the number of "Chronic 2" ingredients, C refers to the number of "Chronic 3" ingredients and D refers to the number of "Chronic 4" ingredients; wherein the ingredients belonging to the "Chronic 4" ingredient categories are defined hereinabove; and wherein the indices a, b, c and d refer to different ingredients.

The Acute and Chronic "$\text{Hazard}_k$" scores of an ingredient may also be predicted by using model-based prediction tools, such as Catalogic software, available from Laboratory of Mathematical Chemistry (LMC), Burgas, Bulgaria, and ECOSAR software, available from the United States Environmental Protection Agency.

Finally, the hazard category of a perfume formula is defined as the average of the Acute hazard category score (Acute category) and the Chronic hazard category score (Chronic category) of the mixture, as defined hereinabove. The corresponding Acute hazard and Chronic hazard scores used to calculate the "Hazard" sub-factor are reported in Table 1.

TABLE 1

Conversion of hazard categories into scores for "Hazard" sub-factor calculations.

| Category of hazard | Category of acute hazard | Acute hazard score | Category of chronic hazard | Chronic hazard score |
|---|---|---|---|---|
| Category 1 | "Acute 1" | 0 | "Chronic 1" | 0 |
| Category 2 | "Acute 2" | 0.33 | "Chronic 2" | 0.33 |
| Category 3 | "Acute 3" | 0.67 | "Chronic 3" and/or "Chronic 4" | 0.67 |
| No category | | 1 | | 1 |

Finally, the scores used for the "Hazard" sub-factor are the average of the above scores, as shown in Table 2.

TABLE 2

Definition of the average "Hazard" sub-factor, depending on both Acute and Chronic hazard scores

| Acute hazard score | Chronic hazard score | Average used in "Hazard" sub-factor |
|---|---|---|
| 0 | 0 | 0 |
| 0 | 0.33 | 0.165 |
| 0 | 0.67 | 0.335 |
| 0 | 1 | 0.5 |
| 0.33 | 0 | 0.165 |
| 0.33 | 0.33 | 0.33 |
| 0.33 | 0.67 | 0.5 |
| 0.33 | 1 | 0.665 |
| 0.67 | 0 | 0.335 |
| 0.67 | 0.33 | 0.5 |
| 0.67 | 0.67 | 0.67 |
| 0.67 | 1 | 0.835 |
| 1 | 0 | 0.5 |
| 1 | 0.33 | 0.665 |
| 1 | 0.67 | 0.835 |
| 1 | 1 | 1 |

As far as the "Hazard" sub-factor is concerned, complex natural ingredients that are present in the formula are treated as sub-formulae, meaning the same calculation procedure, as defined for formulae hereinabove, is applied to the major constituents contained in these complex ingredients in order to determine their acute and chronic hazard categories, wherein "major constituent" means a constituent, which is present at a level of more than 1 wt %, based on the total weight of the complex natural ingredient.

The "Hazard" sub-factor calculation method described hereinabove is particularly preferred in the context of the present invention. However, such methods may be updated with time or replaced by new methods, depending on the regulatory context. Such updated or new methods may be also used in the context of the present invention.

The second factor—the so-called Ingredient Origin factor "Orig" in Equation 1b and 2, above, is concerned with the physical or chemical properties of perfume ingredients that have a bearing on the perception of their sustainability credentials. This factor is ingredient-based and does not comprise any formula-based sub-factors.

The ISO 9235 status of an ingredient is a relevant sub-factor of the "Orig" factor, i.e. whether the ingredient is natural, nature-identical, or synthetic.

By "natural" is meant an ingredient that is of vegetal, animal or microbiological origin, as such, or obtained by physical, enzymatic or microbiological processes, or obtained by traditional preparation processes (e.g. extraction, distillation, heating, torrefaction, fermentation) and do not undergo any chemical modification.

By "nature-identical" is meant an ingredient the chemical structure of which is identical to the equivalent ingredient found in nature, but which has been synthesized using methods not found in nature.

The ISO 9235 status is referred to as the "Iso" sub-factor and is defined in more detail hereinafter. Ingredients that are natural are assigned a value of 1, nature-identical ingredients are assigned a value of 0.5 and synthetics, which are not nature-identical, are assigned a value of zero.

Another relevant sub-factor, which attaches to the "Orig" factor is the number fraction of renewable carbon contained in an ingredient, which is referred to as the "RenewC" sub-factor. The amount of renewable carbon in an ingredient is calculated by dividing the number of carbon originating from a renewable source by the total number of carbon atoms present in the ingredient. This sub-factor is assigned a value of zero if the ingredient contains no renewable carbon; a value of 1 if its number fraction of renewable carbon is equal to 1; and a value between 0 and 1 reflecting the number fraction of renewable carbon contained in the ingredient is between 0 and 1.

A further relevant sub-factor concerns the origin of an ingredient in nature, more particularly whether it is or is not of animal origin. This sub-factor is referred to as "Animal" sub-factor hereinafter and has a score of 0 if the ingredient is of animal origin and 1 if this is not the case.

By definition, the Ingredient Origin factor "Orig" is given a value of 0 if an ingredient of animal origin is present in the formula.

The mathematical expression of the Ingredient Origin factor for an ingredient may be expressed by:

$$\text{Orig}_k = w_4 * \text{ISO}_k + w_5 * \text{Renew}C_k$$

if no ingredient of animal origin is present in the formula (i.e. "Animal"=1), or $$\text{Orig}_k = 0,$$

if one or more ingredient of animal origin is present in the formula (i.e. "Animal"=0)

$w_4$ and $w_5$ are weighting factors that independently take a value of 0.3 to 0.7, more particularly 0.4 to 0.6, still more particularly 0.5, provided that the sum of the two weighting factors is equal to 1.

The mathematical expression of the Ingredient Origin factor for a formula may be given by Equation 4:

$$Orig = w_4 * \sum_{1}^{N} c_K \ Iso_k + w_5 * \sum_{1}^{N} c_K \ RenewC_k \qquad \text{(Equation 4)}$$

If no ingredient of animal origin is present in the formula (i.e. "Animal"=1), or $$\text{Orig} = 0 \qquad (4b)$$

If one or more ingredient of animal origin is present in the formula (i.e. "Animal"=0)

The third factor is the so-called Production factor, referred to as "Prd" in Equation 1b and 2. This factor may comprise both ingredient-specific sub-factors and formula-specific sub-factors. However, preferably, the "Prd" factor is defined at the formula level only and consists of a single sub-factor related to the complexity of the compounding of the ingredients in a formula into a finished perfume. This sub-factor is referred to as "Compound" and is defined at formula level according to rules described in more detail hereinbelow. The mathematical expression of the "Prd" factor according to this particular embodiment is given by Equation 5:

$$\text{Prd} = \text{Compound} \qquad (5)$$

In this case, this factor is zero for a single ingredient formula.

The "Compound" sub-factor, related to the complexity of compounding of the perfume formula, which, in turn, is related to energy and resources consumption. The complexity of compounding may be proportional to the number of ingredients in the formula to be compounded and the corresponding number of simple mixing steps. It may also depend on the number of process steps other than simple mixing steps, such as dosing a powder, melting a crystal, pre-conditioning an ingredient under specific conditions of temperature or humidity, or using special safety means for handling chemically hazardous chemicals, such as chemicals with low flash points. An additional level of complexity is related to the mixing of ingredients having widely different percentages in the formula, as this may require different dosing setups.

In a preferred embodiment, the score of the "Compound" sub-factor is the average of 5 parameters defined as follows:

- Level of powder(s) in weight % in the formula, which relates to whether the formula does contain one or more ingredient in solid, powder form; and at which level these solid, powdery ingredients are present in the formula.
- Number of different powders in the formula.
- Number of pre-conditioned ingredients, which relates to the number of ingredients that need to undergo a special treatment before being used. This includes, for example, pre-heating an ingredient or maintaining warm in a heated room; or storing an ingredient under inert gas.
- Number of hazardous chemicals present in the formula.
- Ratio of the percentage of ingredients having the lowest concentration by the percentage of ingredient having the highest concentration in the formula. This contribution is referred to as "low % to high % ratio" hereinafter.

The value of each contribution to the "Compound" sub-factor is given in Table 3.

TABLE 3

Definition of the value of each contribution to the "Compound" sub-factor

| Contributions | Normal | High | Very high |
|---|---|---|---|
| Level of powder(s) [%] | 0-6 | 6.1-8 | >8 |
| Number of powdery ingredients | 0-6 | 7-9 | >9 |
| Number of pre-conditioned ingredients | 0-2 | 3-8 | >8 |

TABLE 3-continued

Definition of the value of each contribution to the "Compound" sub-factor

| Contributions | Normal | High | Very high |
|---|---|---|---|
| Number of hazardous ingredients | 0-4 | 5-6 | >6 |
| Low % to high % ratio | 1 to 0.01% | 0.009-0.001 | <0.001 |
| Value of each of the above contributions to the "Compound" sub-factor | 1 | 0.5 | 0 |

The score of the "Compound" is the average of all five contributions defined hereinabove.

The fourth factor is the procurement "Prc" factor may be defined by one single sub-factor related to whether the sourcing is responsible or not. This responsible sourcing sub-factor is referred to as "Resp" and is defined in more details hereinafter. Hence, the mathematical expression for the procurement sub-factor of an ingredient is simply:

$$Prc_k = Resp_k$$

The mathematical expression of the procurement factor for a formula containing multiple ingredients is given by Equation 6:

$$Prc = \sum_{1}^{N} c_K \; Resp_k \qquad \text{(Equation 6)}$$

The "$Resp_k$" sub-factor value is determined having regard to whether or not perfume ingredients are prepared in accordance with at least one of the following health and safety practices, social practices, environmental practices and business integrity practices.

Health and safety practices include but are not limited to providing a safe and healthy work-place, employee safety training and access to emergency medical care.

Social practices include, but are not limited to employee's free choice of labor, labor rights, respect and equal treatment, freedom of association and grievance, fair wages, indigenous people prior and informed consent about the use of indigenous intellectual property, and fair and transparent profit sharing with indigenous communities.

Environmental practices include, but are not limited to environmental impact management and mitigation, water resource management, waste recycling and disposal management, efficient energy usage, biodiversity conservation, peat land conservation, no usage of IUCN red-listed plants (see IUCN Red List Categories and Criteria; version 3.1., from the International Union for the Conservation of Nature, ISBN 978-2-8317-1435-6), transport optimization).

Business integrity practices include, for example, business ethics management system according to United Nation Guiding Principles of Business and Human Rights, Universal Declaration of Human Rights, and OECD guidelines for Multinational Enterprises; anti-bribery, gift and entertainment policies, and fair competition under applicable anti-trust, competition and trade practice laws.

If at least one of the practices referred to hereinabove apply at the date of assessment, the "Resp" sub-factor may be given a value of 1. If an ingredient is expected to comply with said at least one practice according to a predefined schedule in accordance with an implementation program it will be given a score that varies with the progress of the implementation program with respect to said ingredient. For example, if compliance is expected with a period of one year then the ingredient will be accorded a value of 0.75, whereas if compliance is expected within a period of two years then the ingredient will be accorded the value of 0.5.

In an embodiment of the invention, Equation 2 may be transformed by a trigonometric Box-Cox transformation to re-center the distribution, followed by a trigonometric transformation to widen the range of sustainability rating values S obtained according to any of Equations 1, 1b, 2, 2b and 2c.

Box-Cox Transformation:

$$\frac{y^{\lambda} - 1}{\lambda}$$

$$\text{with } \lambda = 0.5 \text{ and } y = S + 1 \qquad (12)$$

with the following trigonometric relationships, with x=Box-Cox(S):

$$\text{If } x < 5, \text{ then } y = 5 * \left(1 + \sin\left(\frac{3\pi}{2} + \frac{\pi}{2} * \frac{x}{5}\right)\right)$$

$$\text{If } x \geq 5, \text{ then } y = 5 * \left(1 + \sin\left(\frac{\pi}{2} * \left(\frac{x}{2} - 1\right)\right)\right)$$

In an alternative embodiment, the relevant metric for assigning a value to the environmental factor "Env" comprises:

(A) a first sub-factor, "Biodeg", which concerns the biodegradability of the formula and is obtained by calculating the weighted sum of the biodegradability score of each perfume ingredient in the formula, wherein the biodegradability of a perfume ingredient is assigned a value between 0 and 1, and wherein said first sub-factor is assigned a weighting $w_1$ of 0.3 to 0.7, more particularly 0.5; and (B) a second sub-factor, "Hazard", which is concerned with the aquatic toxicity of the formula, and is assigned a value between 0 and 1, depending on hazard category of the formula; wherein said sub-factor is assigned a weighting $w_3$ of 0.3 to 0.7, more particularly 0.5;

wherein the sum of the weighting $w_1$ and $w_3$ equals 1; and the environmental factor may take a value between 0 and 1; and the relevant metrics for assigning the ingredient origin factor "Orig" comprises:

(A) a first sub-factor, which is the number fraction of renewable carbon contained within a perfume ingredient, "RenewC", and which sub-factor is assigned a value of zero if the ingredient contains no renewable carbon; a value of 1 if its number fraction of renewable carbon is equal to 1; and a value between 0 and 1 reflecting the number fraction of renewable carbon contained in the ingredient is between 0 and 1; wherein said sub-factor is assigned a weighting $w_5$ of 0.3 to 0.7, more particularly 0.4 to 0.6, still more particularly 0.5;

(B) a second sub-factor, which is concerned with the number fraction of upcycled carbon atoms contained within a formula, "Upcycl", which is obtained by calculating the weighted sum of the number fraction of upcycled carbon atoms contained within each perfume ingredient in the formula, wherein the number of upcycled carbon atoms is assigned a value between 0 and 1 depending on the level of upcycled carbon in said perfume ingredient, and wherein said second sub-factor is assigned a weighting $w_5$ of 0.3 to 0.7, more particularly 0.4 to 0.6, still more particularly 0.5;

wherein the sum of the weighting $w_5$ and $w_6$ equals 1; and (C) a third sub-factor, "Animal", which relates to the biological origin of each perfume ingredient in the formula, and is assigned a value of 0 if one or more ingredients in the formula is of animal origin, and a value of 1 if no ingredient of animal origin is present in the formula; and wherein if this third sub-factor has a value of 0, then the sustainability factor "Orig" is 0, or if this third sub-factor has a value of 1, then the sustainability factor "Orig" of the formula is the weighted sum of the first and second sub-factors, (A) and (B); and wherein the ingredient origin factor may take a value between 0 and 1;

and wherein the metric for assigning a value to the sustainability factor "Prd" is according to claim 5 and the relevant metric for assigning a value to the sustainability factor "Prc" is according to claim 6.

According to this alternative embodiment, Equation 3, defined hereinabove, becomes:

$$Env = w_1 * \sum_{1}^{N} c_K\ Biodeg_k + w_3 * \text{Hazard} \quad \text{(Equation 3')}$$

wherein the subscript letter "k" following the sub-factor "Biodeg" refers to a specific ingredient "k", "$\text{Biodeg}_k$" is the value of the biodegradability score for ingredient k; and Equation 4, defined hereinabove, becomes $$Orig = w_5 * \sum_{1}^{N} c_k\ RenewC_k + w_6 * \sum_{1}^{N} c_K\ Upcycl_k \quad \text{(Equation 4')}$$

if no ingredient of animal origin is present in the formula (i.e. "Animal"=1), or $$\text{Orig}=0 \quad \text{(4b')}$$

if one or more ingredient of animal origin is present in the formula (i.e. "Animal"=0).

In the above equation, the subscript letter "k" following the sub-factor "RenewC" and "Upcycl" refers to a specific ingredient "k". Thus "$\text{RenewC}_k$" is the value of the renewable carbon score for ingredient k and "$\text{Upcycl}_k$" is the value of the upcycle carbon score.

Many consumers conflate the notion of "sustainability" with that of "natural" and they believe intuitively that sustainability is served by the adoption of 100% natural ingredients in perfume compositions. However, such an approach only serves to narrow the palette of perfumers and is thus very restrictive on the design freedom perfumers need to create hedonically pleasing and functional perfumes at an acceptable cost.

However, the applicant examined thousands of cost-effective and hedonically-pleasing perfume formulae that are highly performing in consumer product applications and rated them using the sustainability rating method of the present invention. Surprisingly, it was found that in fact, the sustainability rating of perfume formulae is remarkably insensitive to the presence of natural ingredients employed in said formulae over a wide range of concentrations.

Figure 4:
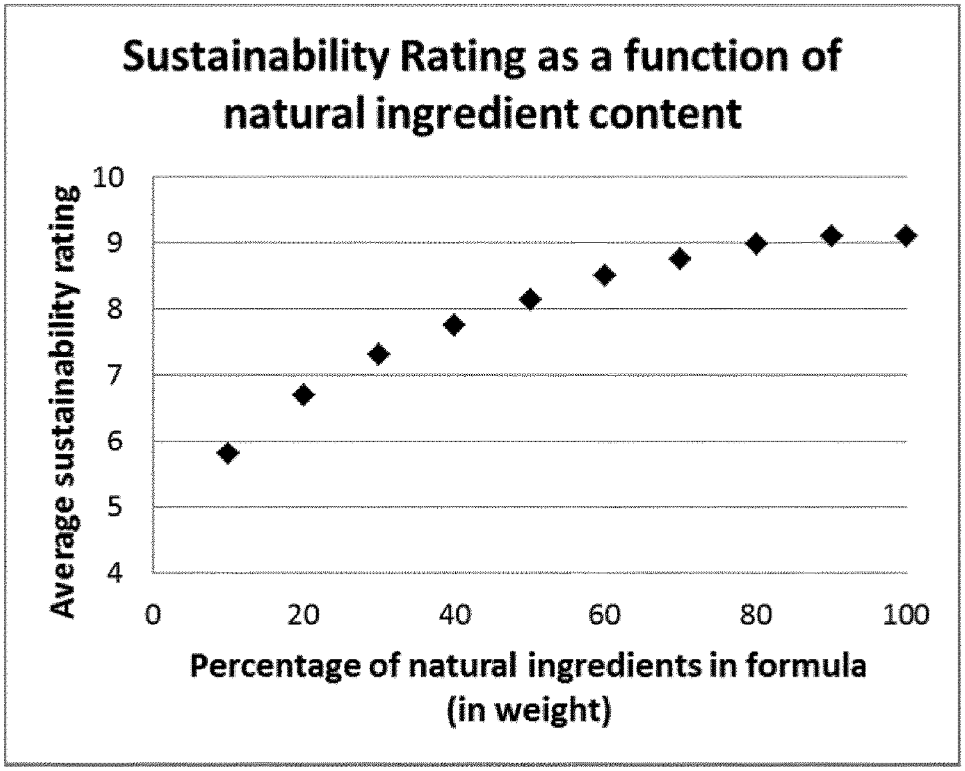
FIG. 4 shows the evolution of the average sustainability rating as a function of the amount (wt %) of natural ingredients in a formula. The graph shows the greater effect relatively low levels of naturals can have on the sustainability of a perfume formula, as well as how the cumulative effect of naturals diminishes as relatively high amounts of naturals are added to a formula.

More particularly, the applicant found that the effect on the sustainability rating of adding ever larger amounts of natural ingredients to a perfume formula diminished at relatively high concentrations of natural ingredients (see FIG. 4). For example, up to about 60 wt %, more particular up to about 40 wt %, addition of natural ingredients can drive relatively large changes in the sustainability rating, but that these changes diminish above these values. Indeed, within the aforementioned range, other sub-factors and metrics were more important drivers of sustainability than the levels of natural ingredients.

Accordingly, the invention provides in another of its aspects a perfume formula comprising perfume ingredients having a known sustainability rating, wherein the formula comprises from about 1 to 90 wt %, more particularly 1 to 60 wt %, more particularly 1 to 40 wt %, more particularly 1 to 20 wt %, more particularly 1 to 10 wt % of natural ingredients.

In particular embodiments, said perfume formula contains no ingredients of animal origin.

In particular embodiments, the perfume formula has a sustainability rating of between 5 and 10, as determined according to the method described herein.

As used herein, the term "known sustainability rating" as it relates to a perfume ingredient or perfume formula or perfume compositions, means that the ingredient, formula or composition that has had its sustainability rating determined using the method described herein.

The insights provided by the method of the present invention enables perfumers to introduce a sustainability design element into the perfume design process, whilst retaining the freedom to employ perfume ingredients widely across the perfumer's palette including synthetics, nature-identical ingredients as well as natural ingredients. Thus, the present invention provides a sustainability rating method that balances the relationship between sustainability, hedonics, performance and cost, and which will enable formulators to manage the future evolution of sustainable, as well as hedonically pleasing and functional perfume formulae in a cost-effective manner.

The methods of the present invention can be carried out advantageously using a computing system. The computer system may comprise suitable hardware and software components commonly known and used in the art.

The computer system may comprise a database of perfume ingredients or formulae in computer readable form. A comprehensive list of perfume ingredients that may be included in the database can be found in the extensive perfumery literature, and includes "Perfume & Flavor Chemicals", S. Arctander (Allured Publishing 1994), as well as later editions of this work, which is hereby incorporated by reference. For each perfume ingredient or formula, the database may contain at least one defining parameter, property or function of that ingredient or formula. In particular, for each ingredient or formula there may be assigned a sustainability rating defined according to the sustainability factors referred to above.

The computer system may comprise data-processing means configured and operable to allow a formulator to select desired ingredients from the database of ingredients, and to determine a sustainability rating for the formula containing said perfume ingredients. If the sustainability rating value is undesirable, the data-processing means can comprise recommendation engine means for guiding the formulator in the substitution of one or more perfume ingredients with one or more other perfume ingredients contained in the ingredients database to provide a new formula of perfume ingredients having a desired sustainability rating with similar hedonics, performance and cost.

The computer system may comprise user interface means allowing the user to make inputs and select perfume ingredients. User inputs can be made by manipulating physically a touch-screen via a key-board, mousepad of joy-stick, or by voice-activation means. Inputs may also be made remotely via an internet connection or from a remote computer device or smart-phone. It is also possible to combine several of these means to enable multiple users to engage and encourage creative collaborations.

The computer system may also be in communication with mixing and dispensing means adapted to receive a formula and physically dispense and mix the perfume ingredients in the formula to form a perfume composition corresponding to the perfume formula.

The exemplary embodiments disclosed hereinabove describe a functional method and system for determining and creating sustainable perfume formulae and perfume compositions conforming thereto, as well as consumer products comprising said perfume compositions. However, it will be clear to a skilled addressee that modifications and variations can be made to the constructions and illustrations disclosed, which will nevertheless fall within the scope of the invention.

There now follows a series of examples to further illustrate the invention.

Example 1

Figure 2:
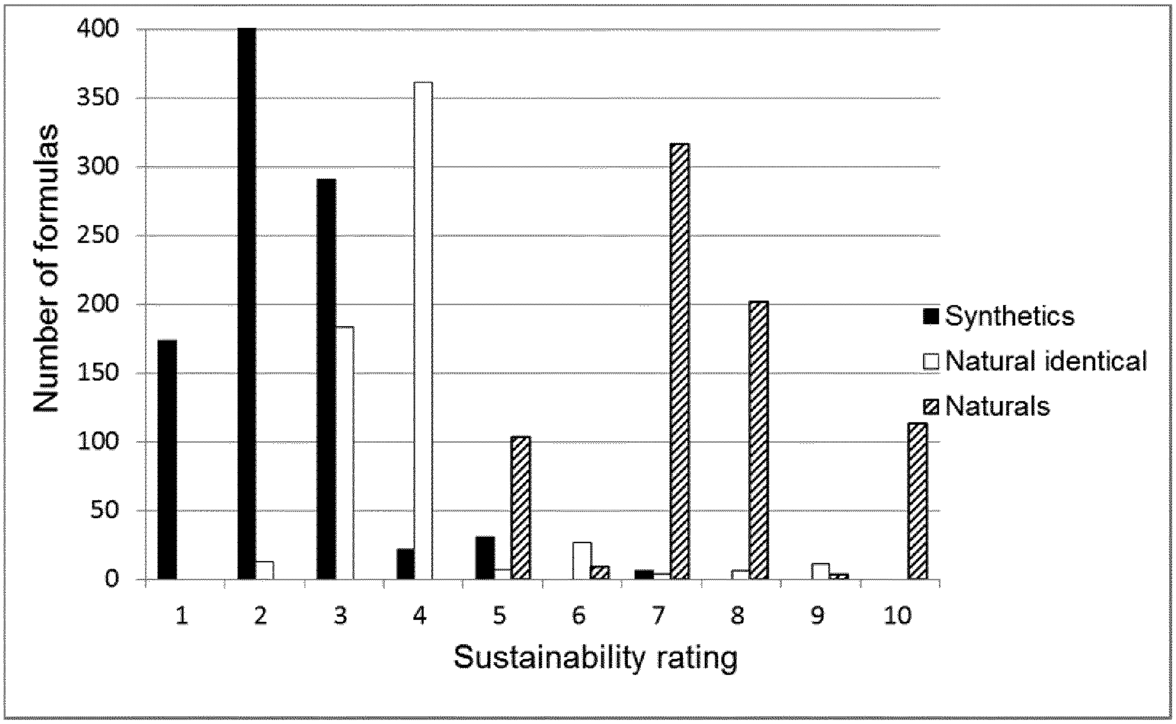
FIG. 2 is a graph of perfume ingredients distributed according to their sustainability rating, determined in accordance with the present invention. The distribution of naturals, synthetics and nature-identical ingredients across the entire scale shows that the sustainability rating index is able to resolve ingredients within a class quite effectively.
Figure 3:
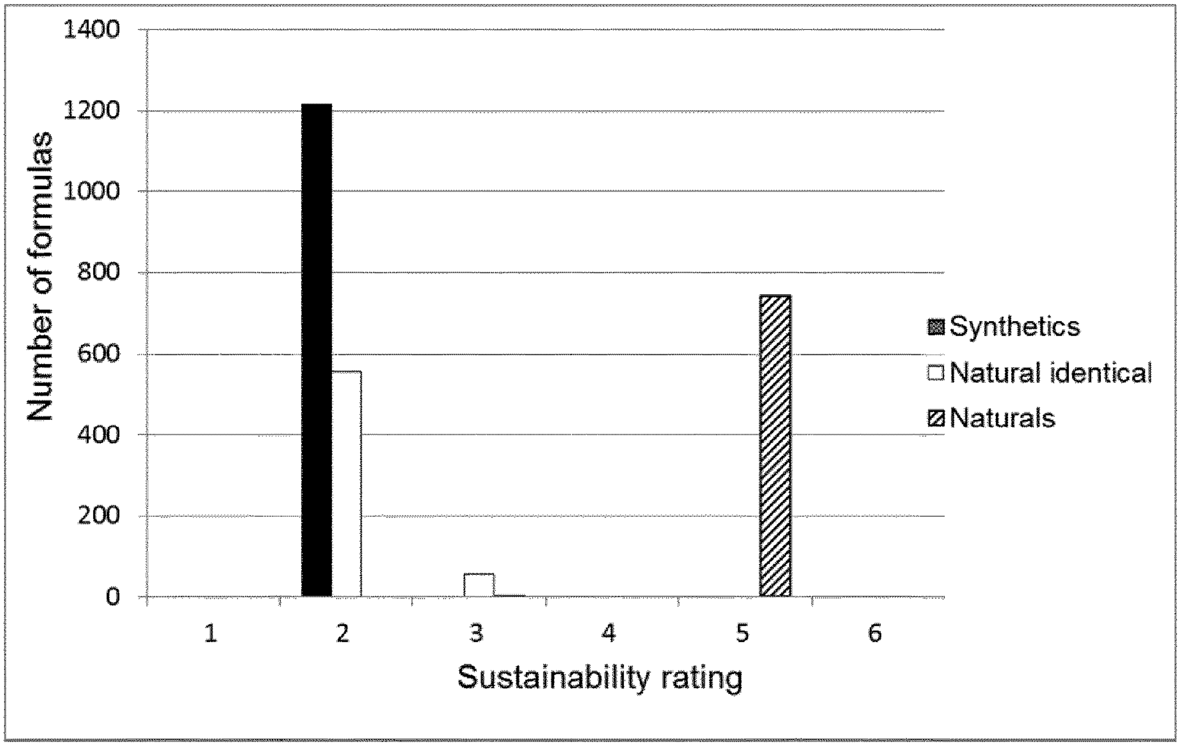
FIG. 3 is a graph of perfume ingredients distributed according to a sustainability metric determined according to prior art techniques. As can be seen, the metric is not effective in resolving ingredients within a class.

In this example, the sustainability rating of 2574 ingredients used in 28732 formulae was calculated according to Equation 2c, by taking into account the ingredient-specific Biodeg, Upcycl, Iso, RenewC, Animal and Resp sub-factors mentioned hereinabove and setting "Compound"=0. For comparison, ingredients and formulae were rated using an alternative prior art index was also calculated according to the scales published under https://www.acs.org/content/dam/acsorg/events/popular-chemsitry/Slides/2017-02-16-cosmetics-slides.pdf, slide 17, consulted Aug. 20, 2018. The corresponding distributions, are shown in FIGS. 2 and 3.

The results show that the sustainability rating according to the present invention has a significantly better differentiating power among perfume ingredients than the prior art method. Furthermore, the way the distributions of both synthetics and nature-identical synthetics are centered is more in line with expectations, with pure synthetics being slightly below the nature-identical synthetics and both of them below many of the naturals. Still, the sustainability rating according to the present invention shows significant overlap between these classes, demonstrating that some synthetics are as sustainable as naturals and that sustainable formulae containing high levels of synthetics can be prepared. Conversely, the sustainability rating confers a lower rating to a significant portion of the naturals, which reflects the fact that harvesting natural ingredients is not always fully aligned with sustainable practices.

Example 2

In this example, the sustainability rating of 30097 formulae was determined using Equation 2c. The value obtained has been expressed as a function of the total concentration of natural ingredients comprised in these formulae.

The results are expressed as the distribution of average sustainability ratings in FIG. 4. Each bar in FIG. 4 represents the average sustainability rating among all formulae having a percentage of natural ingredients higher than the corresponding reported value on the X-axis.

As apparent from the results in FIG. 4 a noticeable increase of the average sustainability rating is already observed at a level of 10 wt % natural ingredients, whereas the rate of sustainability increase levels off above about 40 or 50 wt % naturals. Another striking result is the fact that by considering sustainability ratings at formula level, one increases the sustainability index of synthetic-rich formulae.

The invention claimed is:

1. A method of preparing a perfume composition sustainably, the method comprising the steps of:

selecting at least one perfume ingredient from a palette of perfume ingredients to create a perfume formula;

rating each of the selected at least one perfume ingredient as well as a mixture of the at least one perfume ingredient against a plurality of sustainability factors in order to determine a sustainability rating for the perfume formula, wherein the plurality of sustainability factors are selected from the group consisting of:

i) a sustainability factor "Env" related to environmental impact of the at least one perfume ingredient and the perfume formula comprising the at least one perfume ingredient, wherein the metric for assigning a value to the sustainability factor "Env" comprises:

(A) a first sub-factor, which concerns the biodegradability of the formula and is obtained by calculating the weighted sum of the biodegradability score of each of the at least one perfume ingredient in the formula, wherein the biodegradability of the at least one perfume ingredient is assigned a value between 0 and 1, and wherein said first sub-factor is assigned a weighting of 0.3 to 0.6;

(B) a second sub-factor, which is concerned with the number fraction of upcycled carbon atoms contained within a formula, which is obtained by calculating the weighted sum of the number fraction of upcycled carbon atoms contained within each of the at least one perfume ingredient in the formula, wherein the number of upcycled carbon atoms is assigned a value between 0 and 1 depending on the level of upcycled carbon in the at least one perfume ingredient, and wherein said second sub-factor is assigned a weighting of 0.1 to 0.3;

(C) a third sub-factor, which is concerned with the aquatic toxicity of the formula, and is assigned a value between 0 and 1, depending on hazard category of the formula; wherein said sub-factor is assigned a weighting of 0.3 to 0.6;

ii) a sustainability factor "Orig" related to the origin of the at least one perfume ingredient; wherein the metric for assigning a value to the sustainability factor "Orig" of a formula comprises:

(A) a first sub-factor, which is the ISO 9235 status of the at least one perfume ingredient, and which is assigned a value of 1 if the at least one perfume ingredient is natural; a value of zero if the at least one perfume ingredient is synthetic; and a value of 0.5 if the at least one perfume ingredient is nature-identical; wherein said sub-factor is assigned a weighting of 0.3 to 0.7;

(B) a second sub-factor, which is the number fraction of renewable carbon contained within the at least one perfume ingredient, and which sub-factor is assigned a value of zero if the at least one perfume ingredient contains no renewable carbon; a value of 1 if its number fraction of renewable carbon is equal to 1; and a value between 0 and 1 reflecting the number fraction of renewable carbon contained in the at least one perfume ingredient is between 0 and 1; wherein said sub-factor is assigned a weighting of 0.3 to 0.7, and (C) a third sub-factor, which relates to the biological origin of each of the at least one perfume ingredient in the formula, and is assigned a value of 0 if one or more of the at least one perfume ingredient in the formula is of animal origin, and a value of 1 if no at least one perfume ingredient present in the formula is of animal origin; and wherein if this third sub-factor has a value of 0, then the sustainability factor "Orig" is 0, or if this third sub-factor has a value of 1, then the sustainability factor "Orig" of the formula is the weighted sum of the first and second sub-factors, (A) and (B);

iii) a sustainability factor "Prd" related to the process of production of the at least one perfume ingredient and the perfume formula comprising said the at least one perfume ingredient; wherein the metric for assigning a value to the sustainability factor "Prd" comprises a sub-factor which is concerned with the energy consumption in the production of the perfume formula, and which is assigned a value from 0 to 1, wherein this sub-factor is assigned a weighting of 1; and iv) a sustainability factor "Prc" related to the procurement of the at least one perfume ingredient, wherein the metric for assigning a value to the sustainability factor "Prc" of a formula comprises a sub-factor, which is concerned with the responsible sourcing of all of the at least one perfume ingredient in the formula and is obtained by calculating the weighted sum of the responsible sourcing score of each of the at least one perfume ingredient in the formula, which is assigned a value of 1 if sourcing of the at least one perfume ingredient is considered sustainable, a value of 0 if not, and a value of 0 to 1, depending on whether the procurement of the at least one perfume ingredient is deemed to become responsible within a pre-defined schedule; and wherein this sub-factor is assigned a weighting of 1;

determining if the sustainability rating obtained falls within an acceptable range of sustainability rating values, wherein an acceptable range of sustainability rating i s higher than 4, wherein said sustainability rating is calculated by applying Equation 2c:

$$S=3.33*\text{Env}+3.33*\text{Orig}+1.67*\text{Prd}+1.67*\text{Prc}<10 \quad \text{(Equation 2c)};$$

selecting a perfume formula that does possess a sustainability rating falling within said acceptable range; and mixing the at least one perfume ingredient contained in the selected perfume formula to obtain a perfume composition that has an acceptable sustainability rating.

2. A perfume composition having a formula having a sustainability rating higher than 4, wherein said sustainability rating is calculated according to the method of claim 1.

3. A perfume composition comprising at least one perfume ingredient having a known sustainability rating, wherein the sustainability rating is determined by a process according to claim 1.

4. A consumer product comprising a perfume composition according to claim 3.

5. The method of claim 1, wherein the acceptable range of sustainability rating i s higher than 5.

6. The method of claim 1, wherein the acceptable range of sustainability rating i s higher than 6.

7. The perfume composition of claim 2, wherein the acceptable range of sustainability rating is higher than 5.

8. The perfume composition of claim 2, wherein the acceptable range of sustainability rating is higher than 6.

* * * * *